United States Patent [19]

Riesing

[11] Patent Number: 5,017,262

[45] Date of Patent: May 21, 1991

[54] MATERIAL-WEB MARKING BY MEANS OF BAR CODE

[75] Inventor: Johann Riesing, Vienna, Austria

[73] Assignee: Oesterrechisches Forschungszentrum Seibersdorf Ges. M.B.H., Vienna, Austria

[21] Appl. No.: 477,854

[22] PCT Filed: Jul. 19, 1988

[86] PCT No.: PCT/AT88/00053

§ 371 Date: Jan. 16, 1990

§ 102(e) Date: Jan. 16, 1990

[87] PCT Pub. No.: WO89/00740

PCT Pub. Date: Jan. 26, 1989

[30] Foreign Application Priority Data

Jul. 21, 1987 [AT] Austria .................. 1851/87

[51] Int. Cl.⁵ .............. B32B 31/00; B44C 1/22; B44C 1/165; C23F 1/02
[52] U.S. Cl. .................. 156/630; 156/631; 156/656; 156/667; 156/345; 156/241; 156/300; 156/540; 156/552; 156/562
[58] Field of Search ............ 156/629, 630, 631, 655, 156/656, 657, 667, 663, 295, 297, 298, 299, 300, 345, 540, 541, 548, 552, 553, 562, 230, 238, 241, 247, 249, 289; 65/31

[56] References Cited

FOREIGN PATENT DOCUMENTS 107437 10/1927 Austria .
0170518 2/1986 European Pat. Off. .
0171252 2/1986 European Pat. Off. .
0193334 9/1986 European Pat. Off. .
2184778 12/1973 France .
2586839 3/1987 France .
243085 11/1925 United Kingdom .

OTHER PUBLICATIONS

Patent Abstracts of Japan, Band 8, No. 163 (P-290)(1600), 27 Jul. 1984, & JP, A, 5958630 (Daicel Kagaku Kogyo K.K.) 4 Apr. 1984.

Primary Examiner—William A. Powell
Attorney, Agent, or Firm—Sandler, Greenblum & Bernstein

[57] ABSTRACT

The invention relates to a method and an apparatus for marking flat objects (4) by means of bar code (4). The object of the invention is to form a code, preferably a bar code, in that with the aid of an adhesive, for example, a thermoplastic adhesive, a two-component adhesive, an adhesive solution or the like, glass beads are applied to the objects in the form of a code, such glass beads having a diameter of 0.01 mm to 1 mm, preferably 0.05 mm to 0.8 mm, particularly 0.08 mm to 0.5 mm, and having a refractive index greater than 1.5, preferably 1.85 to 2.0.

54 Claims, 1 Drawing Sheet

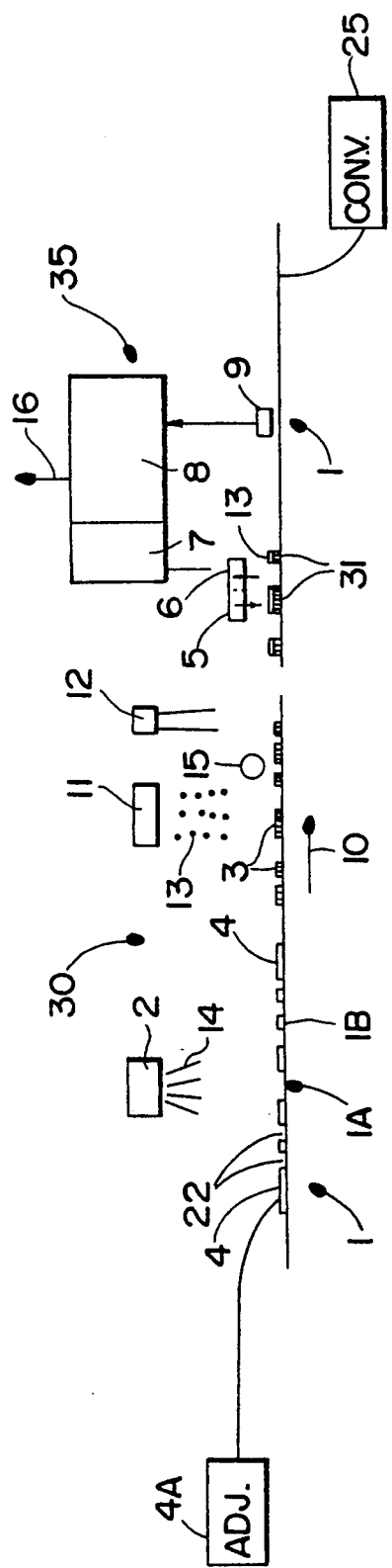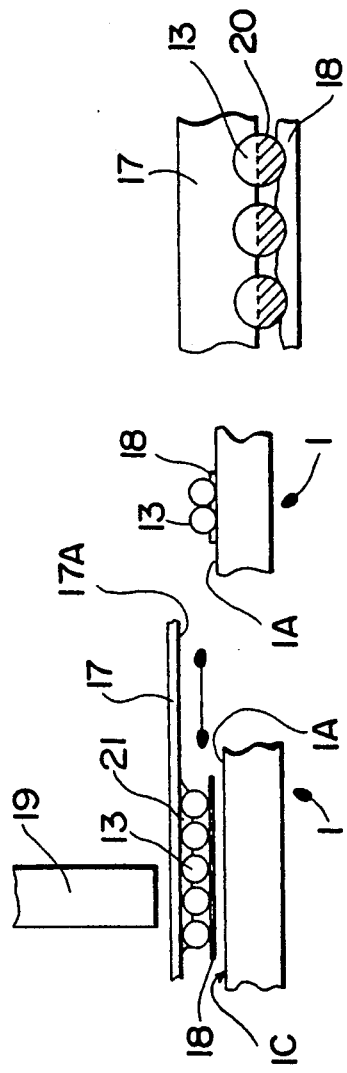

MATERIAL-WEB MARKING BY MEANS OF BAR CODE

BACKGROUND OF THE INVENTION

The present invention relates to a method new and improved of applying codes to preferably flat objects, for example, textile webs, foils, fabrics, strips, window frames, profiled parts or the like. The invention also relates to an arrangement for performing this method.

Such codes can serve, for example, for conducting the marked or coded objects or products during processing thereof to corresponding processing operations or storage locations. Regarding the objects, all those come in question which possess a surface or flat surface portion providing adequate space for applying a code marking, and which are movable past a marking or code forming arrangement. Preferably, mass-produced articles and assembly line articles are marked in such a manner.

SUMMARY OF THE INVENTION

With the foregoing in mind, it is a primary object of the present invention to provide a new and improved method of, and arrangement for, applying codes to an object and which method and arrangement are not afflicted with the drawbacks and limitations of the prior art.

Another and highly significant object of the present invention is directed to the provision of a new and improved method of, and arrangement for, applying codes to an object and which method and arrangement result in highly durable and distinctly readable codes or code markings on such object.

A further important object of the present invention aims at providing a new and improved method of, and arrangement for, applying codes to an object and which method and arrangement particularly permit applying to flat web-type objects code markings which are distinctly readable by means of a scanning or reading device during processing operations or on an assembly line carrying such flat or web-like objects.

A still further important object is directed to providing a new and improved construction of a scanning arrangement for scanning codes or code markings and which scanning arrangement is particularly suited for scanning the codes or code markings which have been applied by carrying out the new and improved method using the new and improved arrangement for applying codes to an object.

Now in order to implement these and still further objects of the invention, which will become more readily apparent as the description proceeds, the method of the present development is manifested, among other things, by the features that for forming a code, preferably a bar code, with the aid of a bonding agent, for example, a thermoplastic adhesive, a two-component adhesive, an adhesive solution or the like, glass beads are applied to the objects in the form of a code, such glass beads having a diameter of 0.01 mm to 1.0 mm, preferably 0.05 mm to 0.8 mm, particularly 0.08 mm to 0.5 mm, and having a refractive index greater than 1.5, preferably 1.85 to 2.0.

The arrangement for performing the method is characterized according to the invention in that the arrangement comprises an application or dispensing device for glass beads having a diameter of 0.01 mm to 1.0 mm, preferably 0.05 mm to 0.8 mm, particularly 0.08 mm to 0.5 mm, and having a refractive index greater than 1.5, preferably 1.85 to 2.0.

In this simple manner there is set up an arrangement of simple construction, by means of which a readily identifiable and accurately readable code can be applied, which code is attached by simple means and readily adheres to objects of varied surfaces. In particular, long material webs can be provided with such codes at a single or at several locations and then can readily be identified. With the arrangement according to the invention, it is rendered possible in simple manner to apply a code to a stationary or to a moving object. The glass spheres used for this purpose are readily detectable. The refractive index and the diameter are advantageously adapted or selected such that the focus of an electromagnetic scanning radiation, particularly light incident at the glass beads for detecting the code, is located within the glass spheres.

It is possible, for example, that the adhesive or bonding agent is sprayed or pressed onto preselected surface areas of the object by using a mask for producing the code, or code markings, for instance, the bar code. The adhesive can also be scraped-on in the form of the code, for instance the bar code. The adhesive can be rubbed on without a mask by means of rubbing wheels, for instance, wheels or rubbing wheels corresponding to the width of the code markings, for example, of the bar code, or pressed on without a mask by means of dies. The glass beads are then applied to the adhesive spread, whereby the adhesive, for instance the bars of adhesive, is preferably entirely covered with the glass beads which, for example, are scattered or blown thereon. Glass beads not adhering to the bars of adhesive or bonding agent are removed, for example by being sucked or blown away.

It is advantageous and simple when the glass beads are conveyed by a carrier which is moved relative to the object to be marked and when an area of the glass beads corresponding—in terms of form—to at least a portion of the desired code is pressed against the object to be marked by at least one pressing device, for instance a die and retained at the object by an adhesive carried by the latter and/or by the glass beads. In practice, the glass beads can be applied to, for instance, a band of plastic material of the carrier and secured thereat by the action of heat, or by means of adhesives or the like. The glass beads can be optionally coated with metal vapor and a layer of adhesive can be applied to the optionally metal-coated glass beads.

It is advantageous when the glass beads applied to the adhesive are pressed by a pressure roller or the like. Adhesives which can be applied are thermoplastic adhesives, mixed adhesives, cold-setting adhesives and so forth. It is essential that the adhesive binds well with the object and the glass beads, and forms a durable compound or bond.

The application of the adhesive to the objects can be effected in the form of the code, for instance the bar code, with the aid of the mask. Either a mask is provided for each code to be applied and is selected for the related case, or the mask is formed adjustable such that a plurality of codes can be formed with the mask and mask portions can be displaced or moved relative to one another in order to form an arrangement of recesses or apertures in the mask, such arrangement corresponding to the code. For forming a bar code, it is also possible to form always only one bar by means of an application device, the bars being applied to the object at corresponding intervals. Furthermore, the mask could be moved together with the object past the adhesive-application device; the object can also be stationary and the mask can be applied thereto, and the adhesive-application device can be moved relative to the mask.

In an arrangement for reading codes, in particular bar codes, which are applied, in particular, to flat objects, such arrangement has an electromagnetic radiation source for irradiating the code, for instance an ultraviolet or infrared emitter, a light source or the like, and has a receiving or sensing device for the reflected radiation, for instance light. An evaluation unit is provided in accordance with the invention and comprises a discriminator circuit by means of which it is possible to suppress signals, which lie between the expected moments of time of arrival of signals produced by rays reflected by the code structured of glass beads, for instance infrared radiation or light or the like, or which signals do not attain a certain intensity and/or duration and are caused by glass beads lying on the material web at undesired locations, i.e. by glass beads adhering to the material web at locations beyond code areas or between bars. By virtue of such a device, the reception of signals and the detection of the code are ensured in a form perfectly suitable for evaluation.

It is of particular advantage that the application of codes to the objects, particularly to those of considerable length, is possible during passing travel of the object. The application of the code as well as the reading of such code during passage under the optical sensor of the code reading device or arrangement in individual different processing operations or processing stages is readily possible. In particular, the momentary location of individual product groups can be determined and it is readily possible to centrally detect and control the flow of goods.

The refractive index and the size and the material of the glass beads permit total reflection of the radiation or light radiated by the code reading arrangement or unit onto the code or code markings for reflection into the receiving device. Advantageously, the glass beads have diameters which correspond to a predetermined distribution curve.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIG. 1 is a schematic sectional view of a first exemplary embodiment of the inventive arrangement for carrying out a first exemplary embodiment of the inventive method as well as an exemplary embodiment of the inventive scanning arrangement;

FIG. 2 is a schematic sectional view of part of a second exemplary embodiment of the inventive arrangement for carrying out a second exemplary embodiment of the inventive method;

FIG. 3 is a schematic sectional view of part of the arrangement illustrated in FIG. 2 at a final stage of carrying out the second exemplary embodiment of the inventive method; and FIG. 4 is a partially sectional view of a part of the arrangement illustrated in FIG. 2 and illustrates a modified version of the second exemplary embodiment of the inventive method and the inventive arrangement.

DETAILED DESCRIPTION OF THE PREFERRED EMBODIMENTS

Describing now the drawings, it is to be understood that only enough of the construction of the inventive arrangement has been shown as needed for those skilled in the art to readily understand the underlying principles and concepts of the present development, while simplifying the showing of the drawing. Turning attention now specifically to FIG. 1 of the drawings, the object 1 illustrated therein by way of example and not limitation will be seen to constitute a flat material web. It should be noted, however, that the object 1 can be constituted by any object having a flat surface portion 1A suitable for applying a code or code markings 31. Such objects 1, may constitute flat objects like, for example, textile webs, foils, fabrics and strips as well as profiled parts such as, for instance, window frames.

The object 1, in the first exemplary embodiment, constitutes a flat material web 1 which is moved according to FIG. 1 by conveying means 25 conjointly with an applied mask 4, in which recesses or apertures are formed in conformity with a code, in the given instance a bar code, past code forming means 30 containing an adhesive application device 2 which sprays adhesive or bonding agent 14 onto the material web 1 through the recesses 22 in the mask 4. The adhesive 14 impacts only the region of the mask 4 and is applied to preselected surface areas 1B of a flat surface or surface portion 1A of the object or material web 1 in accordance with a desired code configuration; those areas of material web 1 located beyond the mask 4 are not impacted. After the application of adhesive has been carried out essentially in the form of the code, the material web 1 with the adhesive spread 3 is moved past a glass-bead dispensing device 11 by means of which glass beads 13 are poured, blown or scattered out of a container and onto the adhesive spread 3. A firm pressing of the glass beads 13 at the adhesive spread 3 can be effected by means of a pressure roller 15. During further travel of the material web 1 in the direction of the arrow 10, removal by blowing or sucking out the glass beads 13 not retained by the adhesive can be effected by a removal device 12, so that surplus glass beads do not cause any erroneous signals when the code or bar code is read.

Subsequently, there is illustrated in the drawing the detection of the code or bar code applied to the material web 1, through the mask 4, by means of a code reading arrangement or unit 35. Radiation or visible light is radiating from a light emitter 5 onto the material web 1 and reflected by the glass beads 13 into a receiving or sensing device 6. The spacings between the code markings 31 or bars are selected to be preferably equal, the width of the bars being equal to the width or a multiple of the width of a predetermined selected bar width. The light receiver or sensing device 6 receives successive radiation or light pulses which produce output signals which are fed to an evaluation unit 8 via a discriminator circuit 7. The discriminator circuit or threshold-value circuit 7 serves for ensuring that glass beads 13 which are located between the individual code markings 31 or bars and were not removed and possibly guide or direct reflections of radiation or light to the receiver 6, are not let through to the evaluation unit 8. The evaluation unit 8 can possess a speed measuring device 9 for measuring the speed of the moved material web 1, in order to be able to check the sequence or the spacings of the bars and determine the timely arrival of the signals as a function of this speed. The evaluation unit 8 can further comprise a computer which, if necessary, can communicate with a central computer unit via a line 16 leading thereto, such central computer unit controlling the entire passage of goods.

For the evaluation, it is also possible to proceed in such a manner that the signals received on the basis of those surfaces of the object limited by the glass beads, are evaluated as the signals corresponding to the code, which means that the code is not determined by the position of the glass beads, but by the spaces between the locations coated with the glass beads. The beginning of the code and the end of the code are thereby marked by a glass-bead code marking 31 or bar of a predetermined width. When the evaluation unit detects such a bar, it accepts in the sequel the lack of reflected radiation as code information and the arrival of reflected radiation as spacing between the code markings. The signals received from or associated with the dark scanned locations thus represent the code.

Instead of a detection of the code or bar code by means of visible light, it is possible to use ultraviolet or infrared radiation or other electromagnetic radiations. To increase the reflection, there can be provided filling materials in the adhesive substance, such as aluminum tinsel, titanium dioxide $TiO_2$ or similar brightening pigments or materials.

It is preferred when glass beads or spheres provided with a reflective metal coating, for instance of aluminum, are applied to the adhesive and when, subsequent to the setting of the adhesive, the metal coating is removed, for instance by etching, from the exposed surfaces of the glass spheres. The metal layers remaining between the glass spheres and the adhesive substance act as mirror surfaces and present optimal surfaces of reflection. Etching away the metal coating in the case of textiles is preferably carried out during customary processing operations, for instance washing in lyes, which washing affects the metal coating.

FIG. 2 shows a second exemplary embodiment of the inventive arrangement in which the glass beads 13 are supported by a carrier 17 which carries out a relative movement with respect to the object 1. The glass beads 13 can be applied to the carrier 17 by means of an adhesive 21 or, as FIG. 4 depicts, pressed into the carrier 17 on a side 17A facing an object side 1C of the object or material web 1. The glass beads 13 carry an adhesive layer 18 which, however, could also be carried by the object 1 or appropriately applied to the latter. By means of at least one die 19 which—in terms of form—corresponds to a code or a code portion, glass beads 13 can be pressed onto the object 1 and separated from the carrier 17. FIG. 3 shows two adjacent rows of glass beads 13 corresponding to the width of the die 19 which could correspond, for instance, to one bar of a bar code. In general, more than two rows of glass beads correspond to the minimum width of a bar.

FIG. 4 shows a section through a modified version of the carrier 17 to which the glass beads 13 are attached by being pressed there into. The carrier 17 can be or may contain a thermoplastic band of plastic material into which heated glass beads 13 are pressed and adhere thereat. The reference numeral 20 designates a mirror or reflective coating of the glass beads 13 provided at the surface at which the glass beads are glued to the object 1.

The adhesive 18 can be self-adhesive. If the adhesive 18 is thermosetting, the die 19 can be constructed to be heatable. If the adhesive 18 is ultraviolet-setting, the pressing surface of the adhesive can be transparent and structured for admission of ultraviolet radiation. The adhesive could also be soluble in water in order to be able to remove codes appled to textile materials during the manufacture thereof.

The means for moving or feeding the object 1, the carrier 17 or the die 19 are not illustrated.

While there are shown and described present preferred embodiments of the invention, it is to be distinctly understood that the invention is not limited thereto, but may be otherwise variously embodied and practiced within the scope of the following claims.

Accordingly, what I claim is:

1. A method of coating an object, comprising the steps of:

placing a code containing a predeterminate number of code markings having a predeterminate dimension at predeterminate spacings between each other on a flat surface portion of the object;

using, as said predeterminate number of code markings, code markings having different reflectivities for electromagnetic radiation used for scanning said predeterminate number of code markings for identifying the object;

said step of placing said code on said flat surface portion of said object entailing the step of imparting to preselected ones of said predeterminate number of code markings an increased reflectivity for said electromagnetic scanning radiation in comparison to the reflectivity for said electromagnetic scanning radiation of remaining ones of said predeterminate number of code markings; and said step of imparting said increased reflectivity to said preselected code markings for said electromagnetic scanning radiation entailing the step of adhesively bonding to preselected surface areas of said flat surface portion of the object, glass beads having a diameter in the range of 0.01 mm to 1 mm and a refractive index above 1.5.

2. The method as defined in claim 1, wherein:
said step of placing said code entails placing a bar code on said flat surface portion of the object.

3. The method as defined in claim 1, wherein:
said glass beads are selected from glass beads having a diameter in the range of 0.05 to 0.8 mm.

4. The method as defined in claim 3, wherein:
said glass beads are selected from glass beads having a diameter in the range of 0.08 to 0.5 mm.

5. The method as defined in claim 1, wherein:
said glass beads are selected from glass beads having a refractive index in the range of 1.85 to 2.0.

6. The method as defined in claim 1, wherein:
said step of adhesively bonding said glass beads to said preselected surface areas of said flat surface portion of the object entails using a preselected bonding agent for adhesively bonding said glass beads to said preselected surface areas; and selecting said bonding agent from the group consisting of thermoplastic adhesives, mixed adhesives and adhesive solutions.

7. The method as defined in claim 1, wherein:

said step of adhesively bonding said glass beads to said preselected surface areas of said flat surface portion of the object entails the steps of:
(i) applying a preselected bonding agent to said preselected surface areas of said flat surface portion of the object; and
(ii) applying said glass beads to said preselected bonding agent applied to said preselected surface areas of said flat surface portion in order to thereby form said preselected code markings having said increased reflectivity for said electromagnetic scanning radiation.

8. The method as defined in claim 7, wherein:
during said step of applying said preselected bonding agent to said preselected surface areas of said flat surface portion of the object, applying said preselected bonding agent to said preselected surface areas of said flat surface portion through a mask configured in correspondence with said preselected surface areas of said flat surface portion.

9. The method as defined in claim 8, wherein:
said step of applying said preselected bonding agent through said mask to said preselected surface areas of said flat surface portion of the object selectively entails either one of (i) sprinkling, (ii) printing, (iii) spraying or (iv) scraping-on said preselected bonding agent through said mask onto said preselected surface areas of said flat surface portion.

10. The method as defined in claim 7, wherein:
said step of applying said preselected bonding agent to said preselected surface areas of said flat surface portion of the object entails rubbing said preselected bonding agent by means of rubbing wheels onto said preselected surface areas of said flat surface portion.

11. The method as defined in claim 7, wherein:
said step of applying said preselected bonding agent to said preselected surface areas of said flat surface portion of the object entails pressing said preselected bonding agent by means of a pressing die onto said preselected surface areas of said flat surface portion of the object.

12. The method as defined in claim 7, wherein:
said steps of applying said preselected bonding agent and said glass beads to said preselected surface areas of said flat surface portion of the object entail the steps of:
(i) arranging a carrier with one side facing said object at an object side containing said flat surface portion;
(ii) applying said preselected bonding agent to said preselected surface areas of said flat surface portion on said object side of the object;
(iii) releasably bonding said glass beads to said one side of said carrier;
(iv) moving relative to each other said carrier and said object containing, on said object side, said preselected bonding agent present on said preselected surface areas of said flat surface portion; and
(v) pressing said one side of said carrier carrying said releasably bonded glass beads, against said object side of the object at least in the region of said preselected surface areas and thereby transferring said releasably bonded glass beads from said one side of said carrier to said preselected bonding agent and securing said transferred glass beads at said preselected bonding agent in said preselected surface areas of said flat surface portion on said object side of the object.

13. The method as defined in claim 12, wherein:
said step of releasably bonding said glass beads to said one side of said carrier selectively entails either one of (i) adhesively bonding or (ii) pressing-in under the action of heat said glass beads to a plastic band of said carrier.

14. The method as defined in claim 12, wherein:
during said step of pressing said one side of said carrier carrying said releasably bonded glass beads against said object side of the object, covering with said glass beads substantially the entire surface area of said preselected bonding agent applied to at least one of said preselected surfaces areas of said flat surface portion of the object.

15. The method as defined in claim 7, wherein:
said steps of applying said preselected bonding agent and said glass beads to said preselected surface areas of said flat surface portion of the object entail the steps of:
(i) arranging a carrier with one side facing said object on an object side containing said flat surface portion;
(ii) releasably bonding said glass beads to said one side of said carrier;
(iii) applying said preselected bonding agent to said glass beads which are releasably bonded to said one side of said carrier, on a side remote from said one side of said carrier;
(iv) moving relative to each other said carrier and the object; and
(v) pressing said one side of said carrier carrying said releasably bonded glass beads and said preselected bonding agent against said object side of the object at least in the region of said preselected surface areas of said flat surface portion of the object and thereby conjointly transferring said releasably bonded glass beads and said preselected bonding agent from said one side of said carrier to said object and securing said transferred glass beads to said preselected surface areas of said flat surface portion on said object side of the object.

16. The method as defined in claim 15, further including the steps of:
applying a further preselected bonding agent to said preselected surface areas of said flat surface portion on said object side of the object; and
during said step of pressing said one side of said carrier carrying said releasably bonded glass beads and said preselected bonding agent against said object side of the object, transferring said releasably bonded glass beads and said preselected bonding agent from said one side of said carrier to said further preselected bonding agent and securing said glass beads to said preselected surface areas of said flat surface portion on said object side of the object.

17. The method as defined in claim 15, wherein:
during said step of applying said preselected bonding agent to said glass beads which are releasably bonded to said one side of said carrier, selectively applying either one of (i) a UV-curable bonding layer, (ii) a self-adhesive bonding layer or (iii) a thermally curable bonding layer; and
during said step of pressing said one side of said carrier carrying said releasably bonded glass beads and said preselected bonding agent against said object side of the object, selectively curing either one of (i) said UV-curable bonding layer or (ii) said thermally curable bonding layer by the respective ones of (i) UV-radiation or (ii) heat.

18. The method as defined in claim 7, wherein:
said step of applying said glass beads to said preselected bonding agent applied to said preselected surface areas of said flat surface portion of the object selectively entails either one of (i) pouring or (ii) blowing said glass beads onto said preselected bonding agent applied to said preselected surface areas of said flat surface portion of the object.

19. The method as defined in claim 7, wherein:
said step of applying said glass beads to said preselected bonding agent applied to said preselected surface areas of said flat surface portion of the object entails covering substantially the entire surface area of said preselected bonding agent by said glass beads.

20. The method as defined in claim 7, further including the step of:
selectively removing from said flat surface portion of the object by either one of (i) suction or (ii) blowing, glass beads which have not become adhered to said preselected bonding agent applied to said preselected surface areas of said flat surface portion of the object.

21. The method as defined in claim 1, further including the steps of:
coating said glass beads with a reflective coating;
said step of adhesively bonding said glass beads to said preselected surface areas of said flat surface portion of the object entailing adhesively bonding said coated glass beads only with a portion thereof to said preselected surface areas and leaving exposed a remaining portion of said glass beads; and
after adhesively bonding said coated glass beads, removing said reflective coating from said exposed portion of said glass beads.

22. The method as defined in claim 21, wherein:
said step of coating said glass beads with said reflective coating entails selecting either one of (i) a metal or (ii) a metal oxide as said reflective coating.

23. The method as defined in claim 21, wherein:
said step of removing said reflective coating from said exposed portion of said glass beads includes etching away said reflective coating from said exposed portion of the glass beads.

24. The method as defined in claim 12, wherein:
said step of releasably bonding said glass beads to said one side of said carrier entails releasably bonding a monolayer of said glass beads to said one side of said carrier.

25. An arrangement for coding an object, comprising:
code forming means for placing a code containing a predeterminate number of code markings having a predeterminate dimension at predeterminate spacings between each other on a flat surface portion of the object;
said code forming means for placing said predeterminate number of code markings on said flat surface portion of the object, placing code markings having different reflectivities for electromagnetic radiation on said flat surface portion of the object for permitting scanning said predeterminate number of code markings by means of a scanning arrangement using electromagnetic scanning radiation for identifying the object;
said code forming means containing means for imparting to preselected ones of said predeterminate number of code markings an increased reflectivity for said electromagnetic scanning radiation in comparison to the reflectivity for said electromagnetic scanning radiation of remaining ones of said predeterminate number of code markings; and
said means for imparting said increased reflectivity for said electromagnetic scanning radiation to said preselected code markings containing means for adhesively bonding to preselected surface areas of said flat surface portion of the object, glass beads having a diameter in the range of 0.01 to 1 mm and a refractive index above 1.5.

26. The arrangement as defined in claim 25, wherein:
said code forming means constitute means for placing a bar code on said flat surface portion of the object.

27. The arrangement as defined in claim 25, wherein:
said glass beads have a diameter in the range of 0.05 to 0.8 mm.

28. The arrangement as defined in claim 27, wherein:
said glass beads have a diameter in the range of 0.08 to 0.5 mm.

29. The arrangement as defined in claim 25, wherein:
said glass beads have a refractive index in the range of 1.85 to 2.0.

30. The arrangement as defined in claim 25, wherein:
said code forming means contain means for employing a preselected bonding agent for adhesively bonding said glass beads to said preselected surface areas; and
said means for employing said preselected bonding agent contain a spray nozzle for selectively applying either one of (i) a thermoplastic adhesive, (ii) a mixed adhesive or (iii) an adhesive solution.

31. The arrangement as defined in claim 25, wherein:
said means for adhesively bonding said glass beads to said preselected surface areas of said flat surface portion of the object comprise:
(i) application means for applying a preselected bonding agent to said preselected surface areas of said flat surface portion of the object; and
(ii) dispensing means for applying said glass beads to said preselected bonding agent applied to said preselected surface areas of said flat surface portion of the object in order to thereby form said preselected code markings having said increased reflectivity for said electromagnetic scanning radiation.

32. The arrangement as defined in claim 31, wherein:
said application means for applying said preselected bonding agent to said preselected surface areas of said flat surface portion of the object contain a mask through which said preselected bonding agent is applied to said preselected surface area; and
said mask being configured in correspondence with said preselected surface areas of said flat surface portion of the object.

33. The arrangement as defined in claim 32, further including:
adjustment means connected with said mask; and
said adjustment means permitting changing the configuration of said mask in adaptation to predeterminate configurations of said code.

34. The arrangement as defined in claim 32, wherein:

said application means for applying said preselected bonding agent selectively contain either one of (i) sprinkling means, (ii) printing means, (iii) spraying means or (iv) blade means for applying said preselected bonding agent through said mask to said preselected surface areas of said flat surface portion of the object.

35. The arrangement as defined in claim 31, wherein:
said application means for applying said preselected bonding agent contain at least one rubbing wheel for rubbing said preselected bonding agent onto said preselected surface areas of said flat surface portion of the object.

36. The arrangement as defined in claim 31, wherein:
said application means for applying said preselected bonding agent contain a die for pressing said preselected bonding agent to said preselected surface areas of said flat surface portion of the object.

37. The arrangement as defined in claim 31, wherein:
said application means and said dispensing means for adhesively bonding said glass beads to said preselected surface areas of said flat surface portion of the object contain:
  (i) a carrier having one side which faces the object at an object side containing said flat surface portion;
  (ii) said application means applying said preselected bonding agent to said preselected surface areas of said flat surface portion on said object side of the object;
  (iii) said carrier carrying said glass beads which are releasably bonded to said one side of said carrier;
  (iv) conveying means for moving relative to each other said carrier and said object containing, on said object side, said preselected bonding agent applied to said preselected surface areas of said flat surface portion; and
  (v) pressing means for pressing said one side of said carrier carrying said releasably bonded glass beads against said object side of the object at least in the region of said preselected surface areas of said flat surface portion for transferring said releasably bonded glass beads from said one side of said carrier to said preselected bonding agent and securing said transferred glass beads to said preselected surface areas of said flat surface portion on said object side of the object.

38. The arrangement as defined in claim 37, wherein:
said carrier contains a plastics band on said one side of said carrier; and
said glass beads being releasably bonded to said one side of said carrier selectively by either one of (i) adhesive bonding or (ii) pressing-in under the action of heat.

39. The arrangement as defined in claim 37, wherein:
said pressing means selectively constitute either one of (i) a pressing roll or (ii) a pressing die, each having a pressing area which covers substantially the entire surface area of said preselected bonding agent applied to at least one of said preselected surface areas of said flat surface portion of the object.

40. The arrangement as defined in claim 31, wherein:
said application means and said dispensing means for adhesively bonding said glass beads to said preselected surface areas of said flat surface portion of the object contain:
  (i) a carrier having one side which faces the object at an object side containing said flat surface portion;
  (ii) said carrier carrying said glass beads which are releasably bonded to said one side of said carrier;
  (iii) said application means applying said preselected bonding agent to said glass beads releasably bonded to said carrier on a side remote from said carrier:
  (iv) conveying means for moving relative to each other said carrier and said object; and
  (v) pressing means for pressing said one side of said carrier carrying said releasably bonded glass beads and said preselected bonding agent, against said object side of said object at least in the region of said preselected surface areas of said flat surface portion for conjointly transferring said releasably bonded glass beads and said preselected bonding agent from one side of said said carrier to said object and securing said transferred glass beads to said preselected surface areas of said flat surface portion on said object side of the object.

41. The arrangement as defined in claim 40, further including:
additional application means for applying an additional preselected bonding agent to said preselected surface areas of said flat surface portion of said object.

42. The arrangement as defined in claim 40, wherein:
said application means selectively contain means for applying either one of (i) a UV-curable bonding layer, (ii) a self-adhesive bonding layer or (iii) a thermally curable bonding layer to said glass beads releasably bonded to said carrier, on said side remote from said carrier; and
said pressing means selectively containing either one of (i) a UV-radiator or (ii) a heating device for selectively curing either one of (i) said UV-curable bonding layer or (ii) said thermally curable bonding layer.

43. The arrangement as defined in claim 31, wherein:
said dispensing means selectively contain either one of (i) pouring means or (ii) blowing means for applying said glass beads to said preselected bonding agent applied to said preselected surface areas of said flat surface portion of the object.

44. The arrangement as defined in claim 31, wherein:
said dispensing means contain means for covering with said glass beads substantially the entire surface area of said preselected bonding agent applied to said preselected surface areas of said flat surface portion of the object.

45. The arrangement as defined in claim 31, further including:
removal means for selectively removing by either one of (i) suction or (ii) blowing, glass beads which have not become adhered to said preselected bonding agent applied to said preselected surface areas of said flat surface portion of the object.

46. The arrangement as defined in claim 25, wherein:
said glass beads constitute glass beads provided with a reflective coating for reflecting said electromagnetic scanning radiation;
said means for adhesively bonding said glass beads to said preselected surface areas of said flat surface portion of the object, adhesively bonding a predetermined portion of said coated glass beads to said preselected surface areas and leaving exposed a remaining portion of said coated glass beads; and removing means for removing said reflective coating from said exposed remaining portion of said glass beads.

47. The arrangement as defined in claim 46, wherein: said reflective coating is selected from either one of (i) a metal or (ii) a metal oxide.

48. The arrangement as defined in claim 47, wherein: said reflective coating constitutes an aluminum-based coating.

49. The arrangement as defined in claim 46, wherein: said removing means constitute etching means for etching away said reflective coating from said exposed remaining portion of said glass beads.

50. The arrangement as defined in claim 25, wherein: said glass beads contain a portion facing said preselected surface areas of said flat surface portion of the object; and said portion of said glass beads being provided with a reflective coating for reflecting said electromagnetic scanning radiation.

51. The arrangement as defined in claim 37, wherein: said carrier carries a monolayer of said releasably bonded glass beads on said one side of said carrier.

52. A scanning arrangement for scanning codes containing, at predeterminate spacings, a predeterminate number of comparatively highly reflective code markings and comparatively poorly reflective code markings for a preselected electromagnetic scanning radiation, said preselected number of highly reflective code markings containing glass beads adhesively bonded to preselected surface areas of a flat surface portion of an object, said scanning arrangement, comprising:

a source for directing said electromagnetic scanning radiation towards the object;

sensing means for receiving reflected electromagnetic scanning radiation reflected from code markings of said object and producing corresponding output signals;

an evaluation unit connected to said sensing means for receiving and evaluating said output signals corresponding to said reflected electromagnetic scanning radiation reflected from said code markings of said object; and said evaluation unit containing a discriminator circuit for differentiating with respect to intensity and time of appearance between code-related signals appearing at predeterminate moments of time and for suppressing other output signals related to noncoded portions of said object.

53. The arrangement as defined in claim 52, wherein: said evaluating unit detecting the absence of reflected electromagnetic scanning radiation between successive ones of the highly reflective code markings; and said evaluating unit identifying as code information the detection of said absence of reflected electromagnetic scanning radiation between said successive highly reflective code markings.

54. The arrangement as defined in claim 52, further including:

conveying means for moving relative to each other said object containing said code markings and said evaluating unit.

* * * * *